(12) United States Patent
Waldron

(10) Patent No.: US 7,198,442 B2
(45) Date of Patent: Apr. 3, 2007

(54) DUST AND DEBRIS EXTRACTION APPARATUS FOR POWER TOOL

(75) Inventor: Mike Waldron, Pocklington (GB)

(73) Assignee: GMCA Pty Ltd., Victoria (AU)

( * ) Notice: Subject to any disclaimer, the term of this patent is extended or adjusted under 35 U.S.C. 154(b) by 0 days.

(21) Appl. No.: 11/347,402

(22) Filed: Feb. 3, 2006

(65) Prior Publication Data

US 2006/0193706 A1     Aug. 31, 2006

(30) Foreign Application Priority Data

Feb. 4, 2005     (GB)     ................... 0502289.2

(51) Int. Cl.
  B23C 1/20     (2006.01)
  B23Q 11/00    (2006.01)
(52) U.S. Cl. ............. 409/137; 409/182; 144/136.95; 144/252.1; 408/67; 451/451
(58) Field of Classification Search ........ 409/137, 409/182, 181, 175, 180; 408/67; 144/136.95, 144/154.5, 252.1, 252.2; 451/456
  See application file for complete search history.

(56) References Cited

U.S. PATENT DOCUMENTS

| | | | | |
|---|---|---|---|---|
| 3,022,806 A * | 2/1962 | Johnston | .................. | 144/252.1 |
| 3,786,846 A * | 1/1974 | Mehring | ................... | 144/252.1 |
| 4,409,699 A * | 10/1983 | Moorhouse | ................. | 409/137 |
| 4,821,365 A * | 4/1989 | Charters | .................. | 144/252.1 |
| 5,311,914 A * | 5/1994 | Stornetta | ..................... | 144/372 |
| 5,584,620 A * | 12/1996 | Blickhan et al. | ............ | 409/137 |
| 5,662,440 A * | 9/1997 | Kikuchi et al. | ............. | 409/182 |
| 6,079,078 A * | 6/2000 | Byington | ..................... | 408/67 |
| 6,132,147 A * | 10/2000 | Kazirskis | ..................... | 408/67 |
| 6,878,050 B2 * | 4/2005 | Wendt et al. | ............... | 451/451 |
| 2002/0168241 A1 * | 11/2002 | David et al. | ................. | 409/178 |
| 2002/0182023 A1 * | 12/2002 | Lai et al. | .................... | 409/137 |
| 2006/0191597 A1 * | 8/2006 | Cooper et al. | ........... | 144/154.5 |

* cited by examiner

Primary Examiner—Erica Cadugan
(74) Attorney, Agent, or Firm—Woodard, Emhardt, Moriarty, McNett & Henry LLP

(57) ABSTRACT

The invention relates to a power tool such as a router which is provided to perform an operation on a work piece. The tool includes dust extraction apparatus to allow dust and debris to be removed from the location at which the work is performed and part of the extraction apparatus is movable between storage and in-use positions. When said part is moved to a storage position, an alternative dust extraction passage may be fitted in to the port or aperture. Typically, the part which is movable can be telescopically movable or alternatively, can be provided of a flexible member so as to be moved between extended and retracted positions.

23 Claims, 6 Drawing Sheets

DUST AND DEBRIS EXTRACTION APPARATUS FOR POWER TOOL

Figure 1:
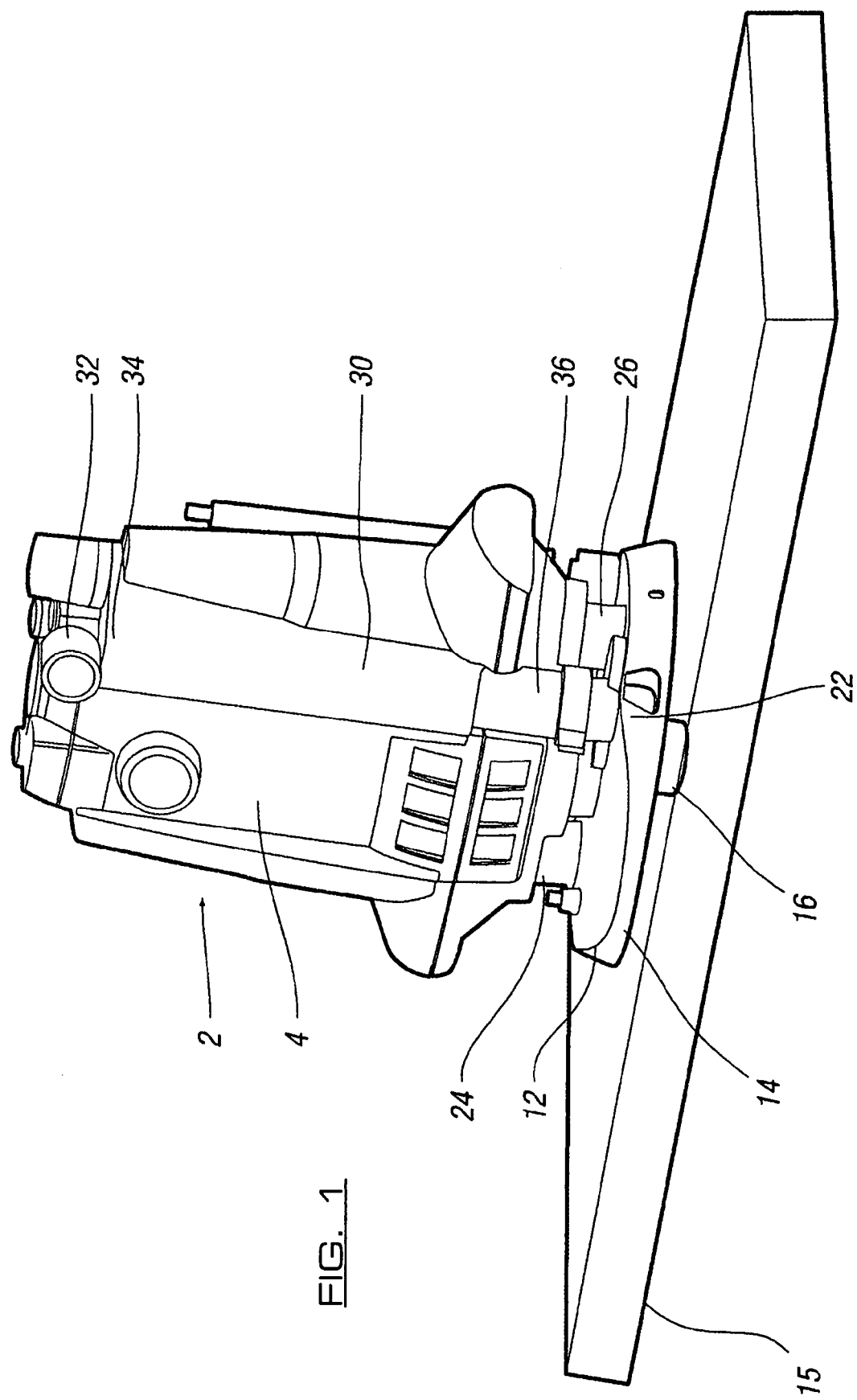

The invention to which this application relates is to a power tool with a means for the removal of dust and debris from a location at which a cutting, piercing or drilling operation is performed on a workpiece by the power tool. The apparatus is of particular use with respect to a power tool in the form of a router which typically comprises a motor in a housing mounted on first and second slidable rods. The motor is provided to drive a routing tool which depends from one end of the housing and is movable into position on and across a workpiece to perform a routing operation on the same. However it should be noted that although the invention is described with respect to a router, the apparatus for removal of the dust and debris may be used, or adapted to be used, with other forms of power tools to advantage.

A problem with power tools is that when they perform the required operation on a workpiece, dust and debris is created. If no extraction means are provided to remove the dust and debris from the work area, then the dust and debris which is created tends to stay around the area at which the operation is taking place on the workpiece, thereby masking guidelines and/or the workpiece itself. This makes subsequent operations on the workpiece difficult to perform and the line of sight of the user of the apparatus is masked, which can be dangerous.

A further problem is that the dust and debris tends to scatter in an uncontrolled manner from the location at which the operation on the workpiece has occurred. This can cause mess throughout a relatively large area which is obviously inconvenient to a user of the power tool. The problem has been known for a period of time and, as a result, dust extraction apparatus has been developed in several forms.

With regard to router power tools, the same are typically provided with a base plate from which the routing tool protrudes selectively under the control of the user. The base plate is typically placed on the workpiece around the area in which the routing operation is to be performed with the routing tool passing through a port formed in the base plate.

Conventionally, at least one aperture is provided in the base plate and, in connection with said aperture, is provided dust extraction apparatus. In one known form, the dust extraction apparatus includes a passage formed along the interior of one of the slide members on which the motor housing is mounted. This can provide a relatively neat and enclosed system for allowing dust and debris to pass along the passage and then be removed typically via a vacuum system connected to the open end of the dust extraction passage. However, because the extraction passage is formed within the slide, if the passage becomes blocked, then there is a need to dismantle the slide which can be problematic and time consuming. Furthermore, the user does not always wish to remove the debris from the top of the housing but rather would wish to remove the debris from a location close to the aperture in the base plate.

In another known form of apparatus, there is provided a series of fitments which can be selectively positioned on the router. In one embodiment these fitments include a first, elbow part with a dust extraction passage passing therealong and a second, straight part with an extraction passage formed therealong. In this arrangement, the aperture in the base plate is provided with location means which act as engagement means to allow the selective engagement thereon of either the elbow or straight extraction passages. If the elbow part is in position then the debris passes through the aperture and through the passage to leave the apparatus at approximately 90 degrees to the direction in which the same entered the passage. The free end of the channel can be connected to a vacuum apparatus to allow the debris to be induced through the channel and removed from the apparatus and discarded. If the straight part is connected to the aperture in the base plate, then the dust passes in a straight line along the passage to the opening near the top of the router whereupon a vacuum apparatus can be connected. Alternatively, the elbow part can be connected to the top of the straight part and then subsequently connected to the vacuum apparatus. However in practice it is found that when the straight extraction part is used, the material from which the channel is made is sufficiently brittle such that the movement of the free end of the part can cause the same to break close to the location on the aperture in the base plate. As a result, there is typically provided location means on the straight extraction channel which is formed to locate on a feature of the router such as for example an adjustment knob for one of the slide members on which the housing is mounted. While it is known that this dust extraction system does operate successfully, the same is prone to breakage, the parts are prone to being lost and the general fitting of the various parts can be time consuming and irritating to the user.

The aim of the present invention is to provide apparatus which allows for the efficient extraction of dust and debris from the location of the performance of an operation on the workpiece and to provide for the selective configuration of said dust extraction apparatus in an efficient manner.

In a first aspect of the invention, there is provided a power tool, said power tool including a base to be located at or adjacent a work piece on which an operation is to be performed by the power tool, and dust extraction apparatus including a passage mounted on the power tool and wherein said passage includes a portion which can be selectively moved between an in-use position at which an end of the portion is located adjacent the base to allow dust and debris from the workpiece operation to be guided through the passage, and a storage position in which the said end of the portion is in a position spaced from the base.

In one embodiment a port or aperture is provided in the base and through which the dust or debris passes to the passage when connected thereto.

In one embodiment when the portion of the passage is in the storage position, a further dust extraction passage can be located with respect to the aperture or port.

Typically the first passage is of a generally linear shape and the further dust extraction passage is provided with a bend.

In one embodiment the portion of the passage is telescopically movable with respect to the remainder of the passage.

In an alternative embodiment the portion is a flexible member and can be increased or decreased in length to move between said in-use and storage positions. In one form, the portion can be provided with a bellows formation or alternatively the portion includes a resilient means therein to allow the same to be extended, typically by pulling, to an in-use position and retracted to a storage position, by pushing. In one embodiment at least one of the pushing or pulling movements can be achieved instead of manual movement by the influence of the resilient means.

In one embodiment the resilient means is a spring.

In one embodiment the further extraction passage can be mounted on a fixed part of the passage when the portion is in the in use position. In this position the further extraction passage forms an extension of the passage along which the dust and debris passes. Also, the free end of the first or further passage can be connected to vacuum apparatus to allow the dust and debris to be drawn from the tool and moved to a location for collection.

In one embodiment attachment means are provided at or adjacent to the port or aperture to allow the passage portion to be attached thereto when in the in-use position and allow the dust and debris to pass from the port or aperture and through the passage.

Typically the power tool is in the form of a router and the features herein described are applicable for use with the router. In one embodiment the passage is positioned with it's longitudinal axis parallel to the axis running from the base to the top of the router. The longitudinal axis of the passage can also be parallel to the longitudinal axis of an adjuster column with respect to which the router body is adjustable in relation to the base.

Typically the base has an opening through which a routing tool or bit protrudes and the aperture or port through which the dust and debris passes is provided in connection with the underside of the base and in connection with a chamber formed within a protective guard in which the routing tool is located.

In a further aspect of the invention there is provided a power tool router said router having a body from which depends a routing tool bit depending towards and through a base for location at or adjacent to a workpiece on which an operation is to be performed by the routing tool bit, at least one aperture or port is provided on the base to allow dust and debris created during the performance of the operation to pass from the vicinity of the routing tool bit and through the said port or aperture to dust extraction apparatus, said dust extraction apparatus including a passage mounted on the power tool and wherein said passage includes a portion which can be selectively moved between an in-use position in which an end of the same is located with respect to the aperture or port so as to form a continuous passage through which dust and debris can pass and a storage position in which the free end of the said portion is removed from the said aperture or port.

In one embodiment, when the portion of the passage is in the storage position, an alternative further extraction passage can be located on the port or aperture to allow the dust and debris to pass therethrough. Typically the said further extraction passage in this position lies in the gap between the said port or aperture in the base and the end of the portion of the passage in the storage position.

Typically the first extraction passage is of a generally linear form and the further extraction passage is provided with a bend.

In one embodiment, the router body houses a motor in connection with the routing toolbit to rotate the same. Typically the aperture through which the dust and debris is required to pass, is provided in location with the underside of the base adjacent the workpiece and in connection with a chamber formed by the base and a protective guard in which the routing tool is located such that dust and debris created by the operation on the workpiece passes into the chamber and in turn through the aperture towards the extraction passage.

Typically the free end of the extraction passage which is removed from the aperture in the base plate, is provided with suitable connections to allow vacuum apparatus to be connected thereto so as to allow dust and debris to be encouraged to pass through the extraction channels and to be removed therefrom for subsequent storage and/or discarding.

Figure 3:
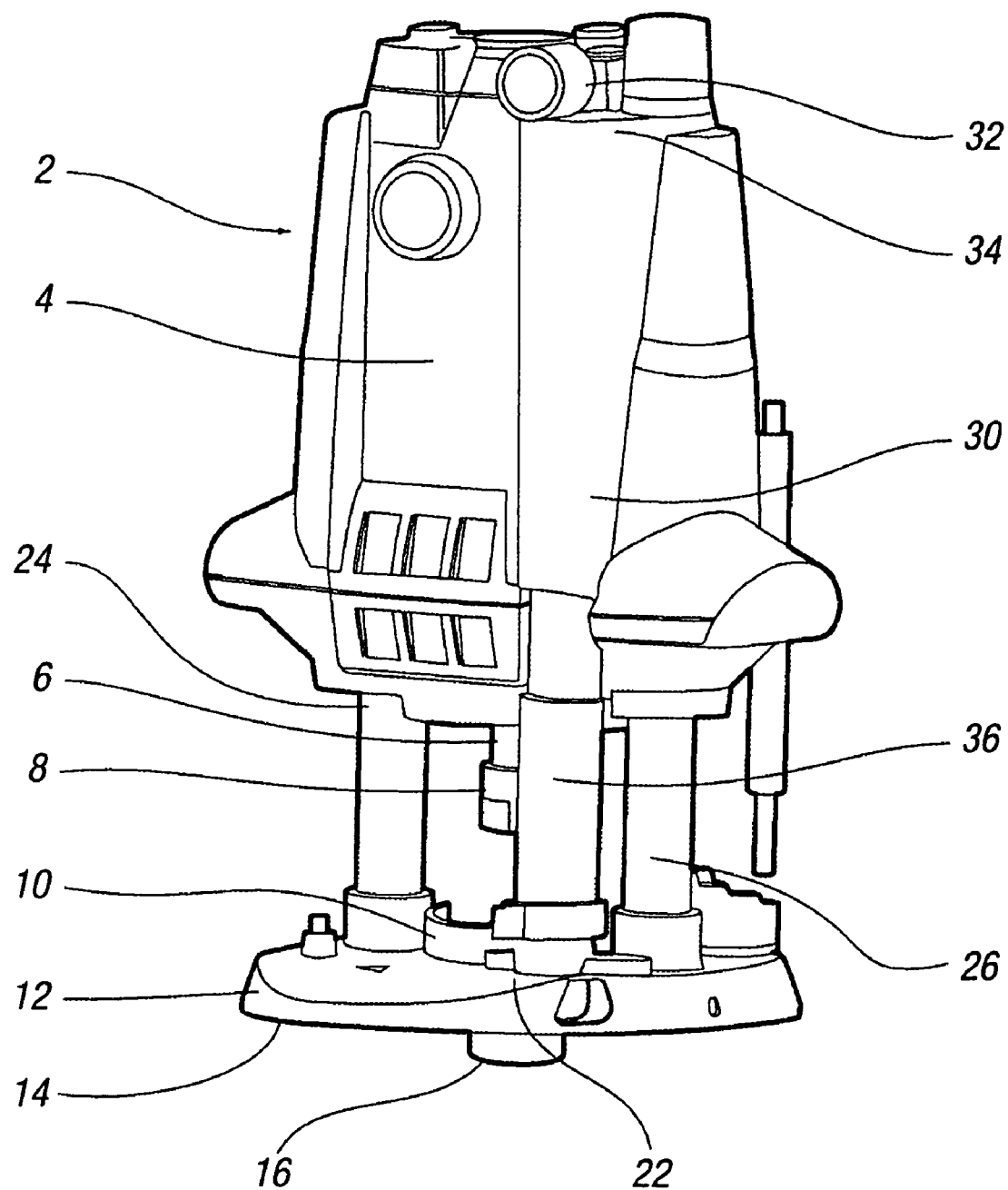
Figure 4:
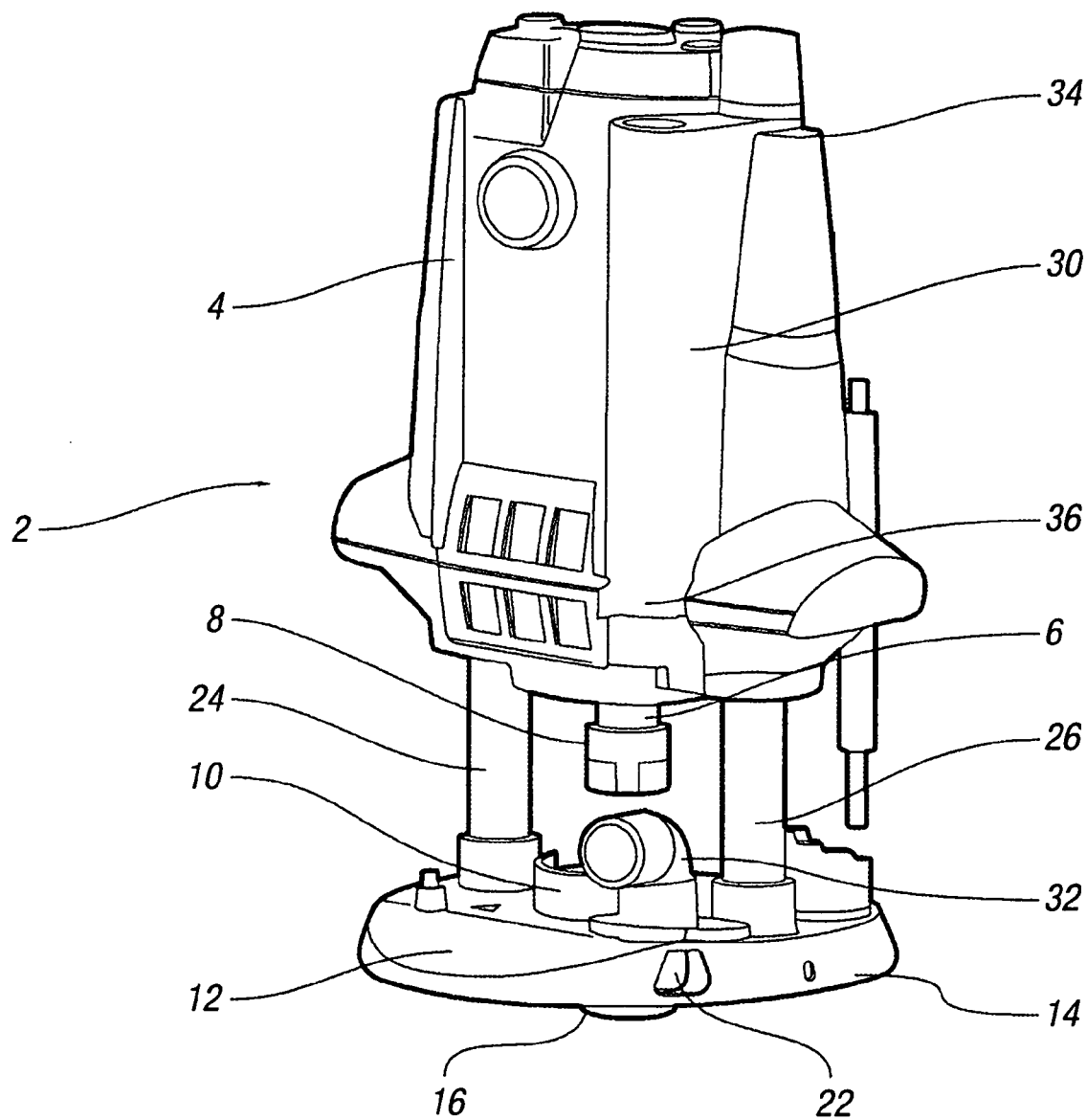
Figure 5:
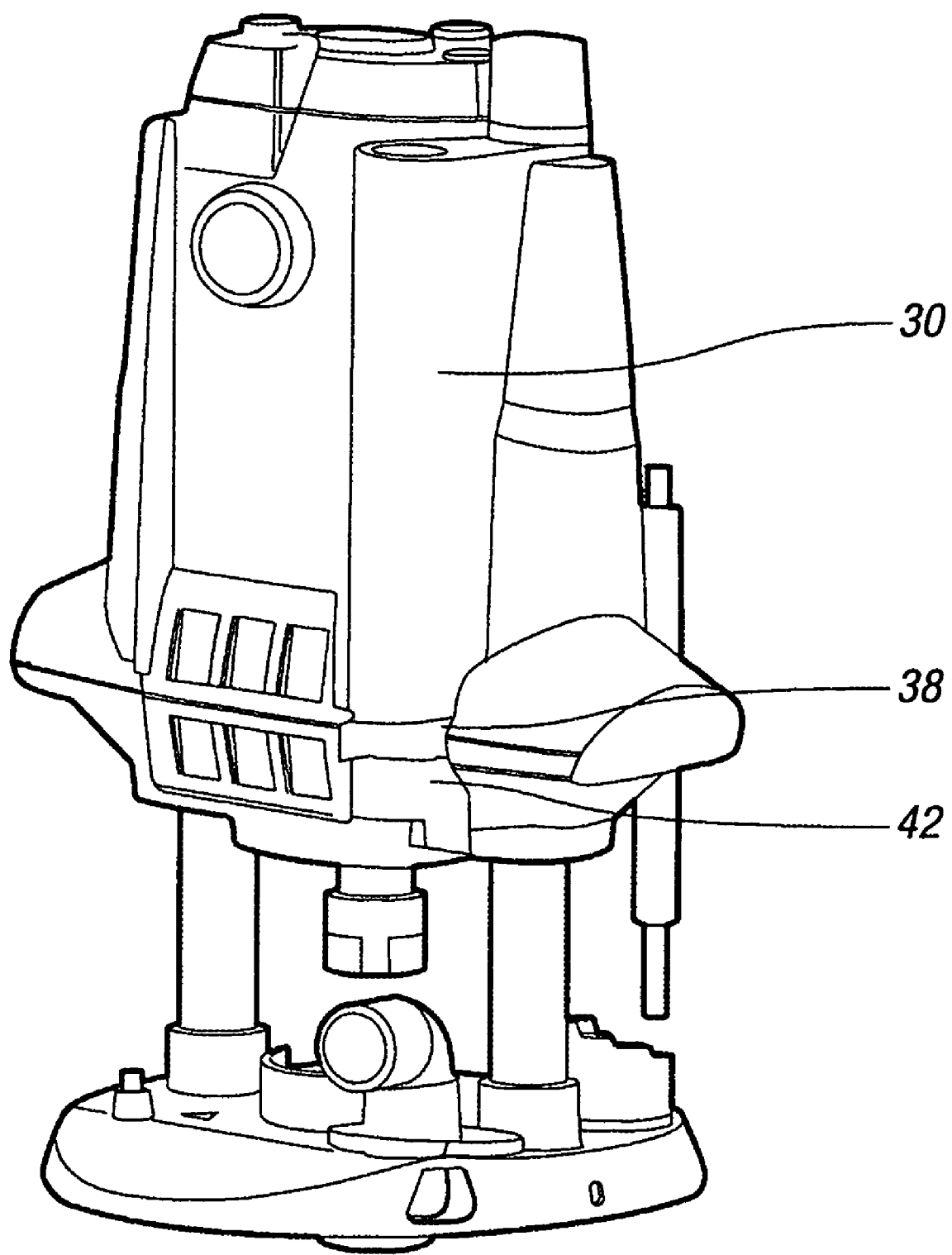
Figure 6:
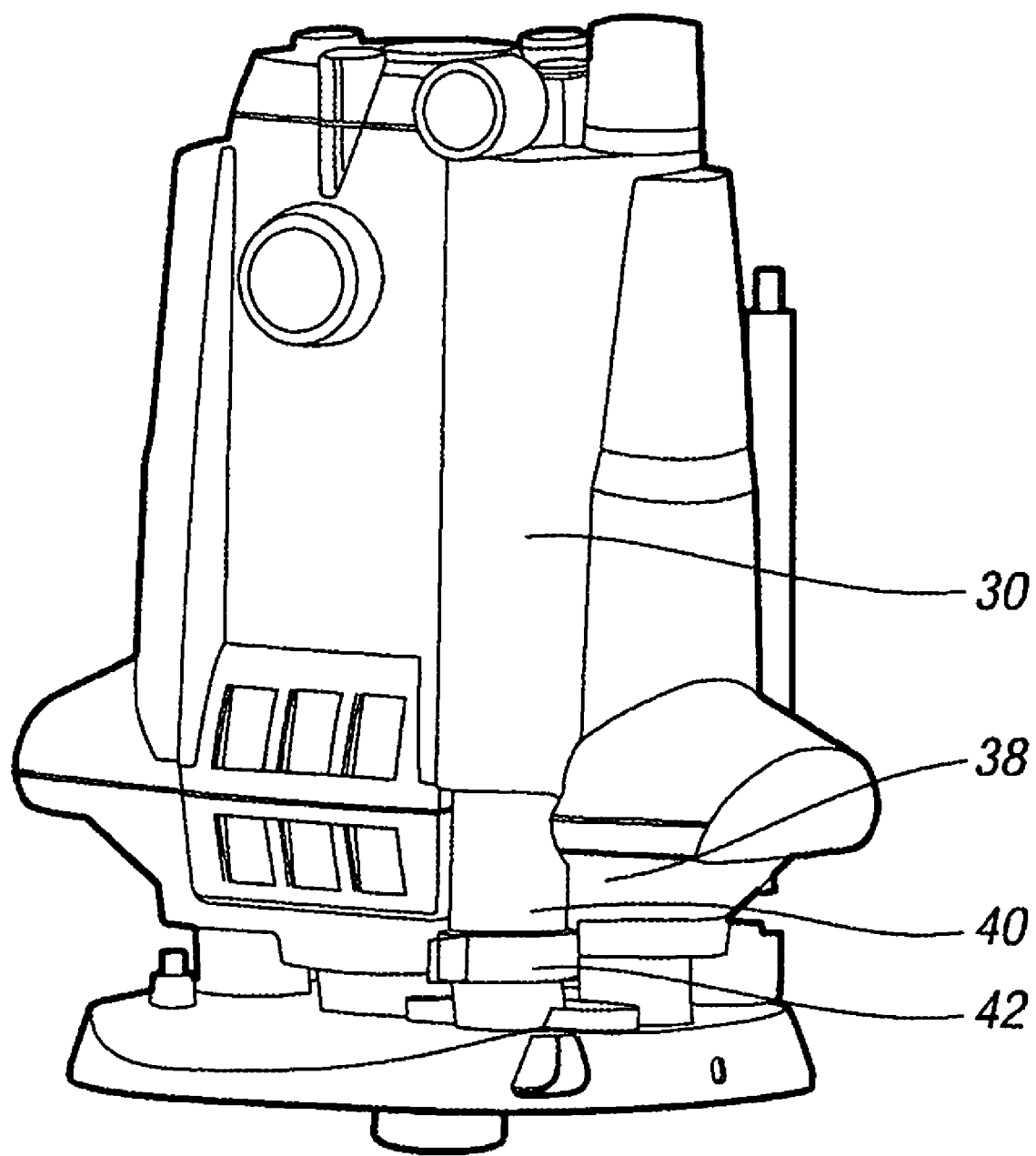

Specific embodiments of the invention are now described with reference to the accompanying drawings, wherein:

FIGS. 1 to 4 illustrate perspective views of a power tool router in accordance with one embodiment of the invention in different configurations; and FIGS. 5 to 6 illustrate perspective views of a power tool router in accordance with a second embodiment of the invention.

Figure 2:
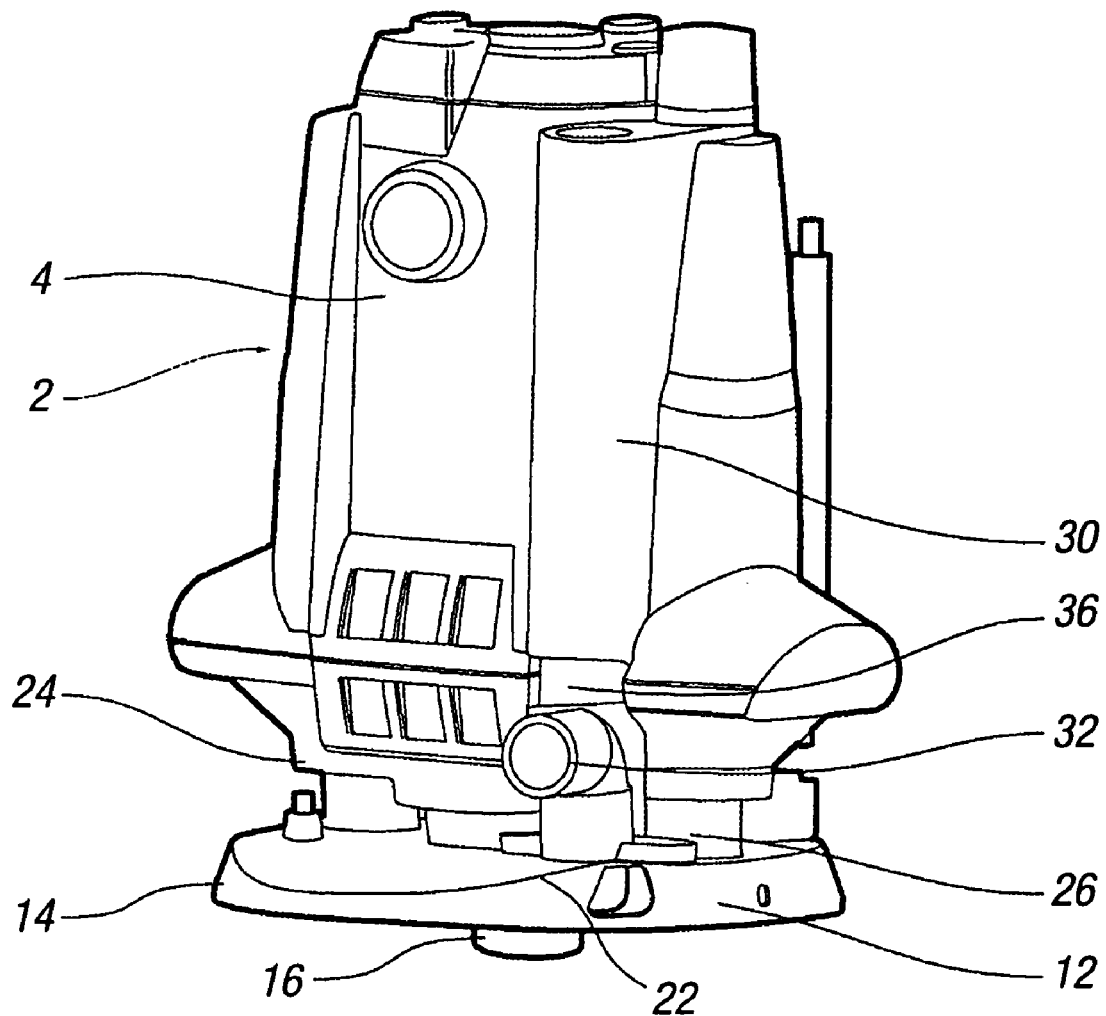

Referring firstly to FIGS. 1 to 4, there is illustrated a router 2 in accordance with one embodiment of the invention. The router 2 comprises a body 4 within which is contained a motor (not shown). The motor is connected to rotate a shaft 6 to which any of a series of routing toolbits 8 can be selectively connected. The shaft and routing tool extend through a port 10 in a base plate 12. The underside 14 of the base plate 12 is provided, in use, to be located on a surface of a workpiece 15 shown for illustration in FIG. 1 only, in which the routing operation is to be performed. The underside of the base plate can typically include a chamber 16 adjacent the routing tool so as to allow dust and debris which is created to pass into the chamber and then through a port or aperture 21, as shown in broken lines in FIG. 1 only, which passes from the underside of the base through the same to the top side of the base and collar 22. The collar 22 can be used as a connection means for the attachment of the first or second dust and debris passages thereto in their selected positions as will be described subsequently. The housing and hence spindle and routing tool, can be moved vertically via adjustment of the housing with respect to slide or adjustment means 24, 26 on which the housing is mounted. Many different forms of adjustment can be used and do not affect the current invention and hence will not be described in detail here. However it should be appreciated that the height of the housing with respect to the base can be adjusted to suit particular required routing operations. FIGS. 1 and 2 show the housing in a relatively low position and FIGS. 3 and 4 show the housing in a relatively high position.

In FIGS. 1 to 4, there is shown dust and debris extraction apparatus in accordance with one embodiment of the invention as part of the router. The apparatus comprises a first, linear extraction passage 30 which is attached to or can be formed as part of the housing of the router and the longitudinal axis of the same is substantially in parallel with the longitudinal axis of the adjusting members and the tool itself. A further elbow shaped extraction passage 32 is also provided which can be selectively positioned on the apparatus.

The first extraction passage 30 is provided with a portion 36 selectively movable between a storage position in which the free end of the same is spaced from the base plate so that the same is not in connection with the aperture 21 or collar 22 in the base plate as shown in FIGS. 2 and 4 and an in-use position in which the portion 36 and hence passage is connected to the aperture 21 and hence collar 22 in the base plate such that dust will pass from the aperture therethrough and along the passage 30 to the free end 34 as shown in FIGS. 1 and 3.

In the embodiment shown in FIGS. 1 to 4, the first extraction passage portion 36 is telescopic and can be selectively moved by the user between the in-use position in which most of the portion is extended from the passage and a storage position in which most of the portion is housed within the passage as shown. In a preferred arrangement, locking means are provided so as to allow the telescopic portion to be retained in the storage position and prevent the same from falling down in an unwanted manner.

The second extraction passage 32 can be connected to the aperture 21 and collar 22 as shown in FIGS. 2 and 4 when the portion 26 is in the storage position, with the passage 32 lying in the gap which is left and allowing the dust and debris to be directed around the bend in the passage 32 and off to the side of the router rather than to the top. Alternatively when the portion 36 is in the in use position shown in FIGS. 1 and 3, the further extraction passage can be attached to the free end 34 of the first extraction passage as shown in FIGS. 1 and 3 to extend the first passage 30 and direct the dust and debris from the same.

In FIGS. 5 and 6, the first extraction passage 30 is provided with a portion in the form of a flexible member 38 rather than a telescopic portion. The flexible member is provided with a spring-like member 40 passing therealong, said spring-like member covered with a lining. In this embodiment location means can be provided to secure the portion in a retracted position and when the engagement means are released, the user can pull on the free end 42 of the portion to extend the same down towards the aperture and engage the same with the aperture to form the extraction passage between the aperture and dust or debris removal means.

It will therefore be appreciated that in accordance with the present invention, there is no longer a need to have an elongate extraction passage which has to be fitted every time it is to be used and/or provided with location means which are also required to be located on the router tool every time it is used. As such, the risks of damage or breakage of the dust extraction apparatus is reduced while ensuring that the adaptability and ability for the user to select a particular extraction configuration to be used, can still be maintained.

The invention claimed is:

1. A power tool, said power tool including a body portion for driving a tool bit, and also including a base spaced therefrom to be located at or adjacent a work piece on which an operation is to be performed by the power tool, and a dust extraction apparatus including a passage mounted on the power tool and wherein said passage includes a first portion attached to the body of the power tool, and a second portion connected at an end of the first portion and having an opposite end which can be selectively moved between an in-use position at which said opposite end of the second portion is located adjacent to and operably connected with a port or aperture in the base to allow dust and debris from the workpiece operation to be guided through the passage, and a storage position in which the said opposite end of the second portion is in a position spaced from and not operably connected with the base.

2. A power tool according to claim 1 wherein the port or aperture is provided in the base such that the dust or debris passes therethrough to the passage when operably connected thereto.

3. Apparatus according to claim 2 wherein when the second portion of the passage is in the storage position, a further dust extraction passage can be located with respect to the aperture or port.

4. Apparatus according to claim 3 wherein the passage is of a generally linear shape and the further dust extraction passage is provided with a bend.

5. Apparatus according to claim 3 wherein the further extraction passage is mounted on a fixed part of the passage when the second portion is in the in use position.

6. Apparatus according to claim 5 wherein the further extraction passage forms an extension of the passage along which the dust and debris passes.

7. Apparatus according to claim 6 wherein a free end of the further passage can be connected to vacuum apparatus to allow the dust and debris to be drawn from the tool and moved to a location for collection.

8. Apparatus according to claim 1 wherein the second portion is telescopically movable with respect to the first portion of the passage.

9. Apparatus according to claim 1 wherein the second portion is a flexible member and can be increased or decreased in length to move between said in-use and storage positions.

10. Apparatus according to claim 9 wherein the second portion is provided as a bellows.

11. Apparatus according to claim 9 wherein the second portion can be extended by pulling to an in-use position and retracted to a storage position by pushing.

12. Apparatus according to claim 1 wherein attachment means are provided at or adjacent to the base to allow the second passage portion to be attached thereto in the in-use position and allow the dust and debris to pass from the port or aperture and through the passage.

13. Apparatus according to claim 1 wherein when the second portion of the passage is located in the in use position, a continuous dust extraction passage is formed from the base to the end of the passage.

14. Apparatus according to claim 1 wherein the power tool is a router.

15. Apparatus according to claim 14 wherein the passage is positioned with a longitudinal axis parallel to the axis running from the base to the top of the router.

16. Apparatus according to claim 15 wherein the base has an opening through which a routing toolbit protrudes.

17. Apparatus according to claim 14 wherein a longitudinal axis of the passage is parallel to the longitudinal axis of an adjustment means with respect to which the router body is adjustable in relation to the base.

18. Apparatus according to claim 1 wherein a chamber is formed within a protective guard in which a routing toolbit is located and from which the dust and debris is extracted.

19. A power tool router, said router having a body from which depends a routing tool bit depending towards and through a base for location at or adjacent to a workpiece on which an operation is to be performed by the routing tool bit, at least one aperture or port is provided on the base to allow dust and debris created during the performance of the operation to pass from the vicinity of the routing tool bit and through the said at least one port or aperture to a dust extraction apparatus, said dust extraction apparatus including a passage mounted on the power tool and wherein said passage includes a first portion mounted on the body and a second portion connected at an end of the first portion and having an opposite end which can be selectively moved between an in-use position in which the said opposite end of the second portion is located connected with respect to the at least one aperture or port so as to form a continuous passage through which dust and debris can pass, and a storage position in which the said opposite end of the said second portion is removed from the said at least one aperture or port.

20. A power tool router according to claim 19 wherein when the second portion of the passage is in the storage position, a further extraction passage can be located to allow the dust and debris to pass therethrough.

21. A power tool router according to claim 20 wherein the said further extraction passage lies in a gap between the said at least one port or aperture in the base and the said opposite end of the second portion of the passage in the storage position.

22. A power tool router according to claim 20 wherein the passage is of a generally linear form and the further extraction passage is provided with a bend.

23. A power tool router according to claim 19 wherein a vacuum apparatus can be connected to the passage so as to allow dust and debris to be encouraged to pass though the extraction passage and to be removed therefrom for subsequent storage and/or discarding.

* * * * *